Patented Nov. 14, 1939

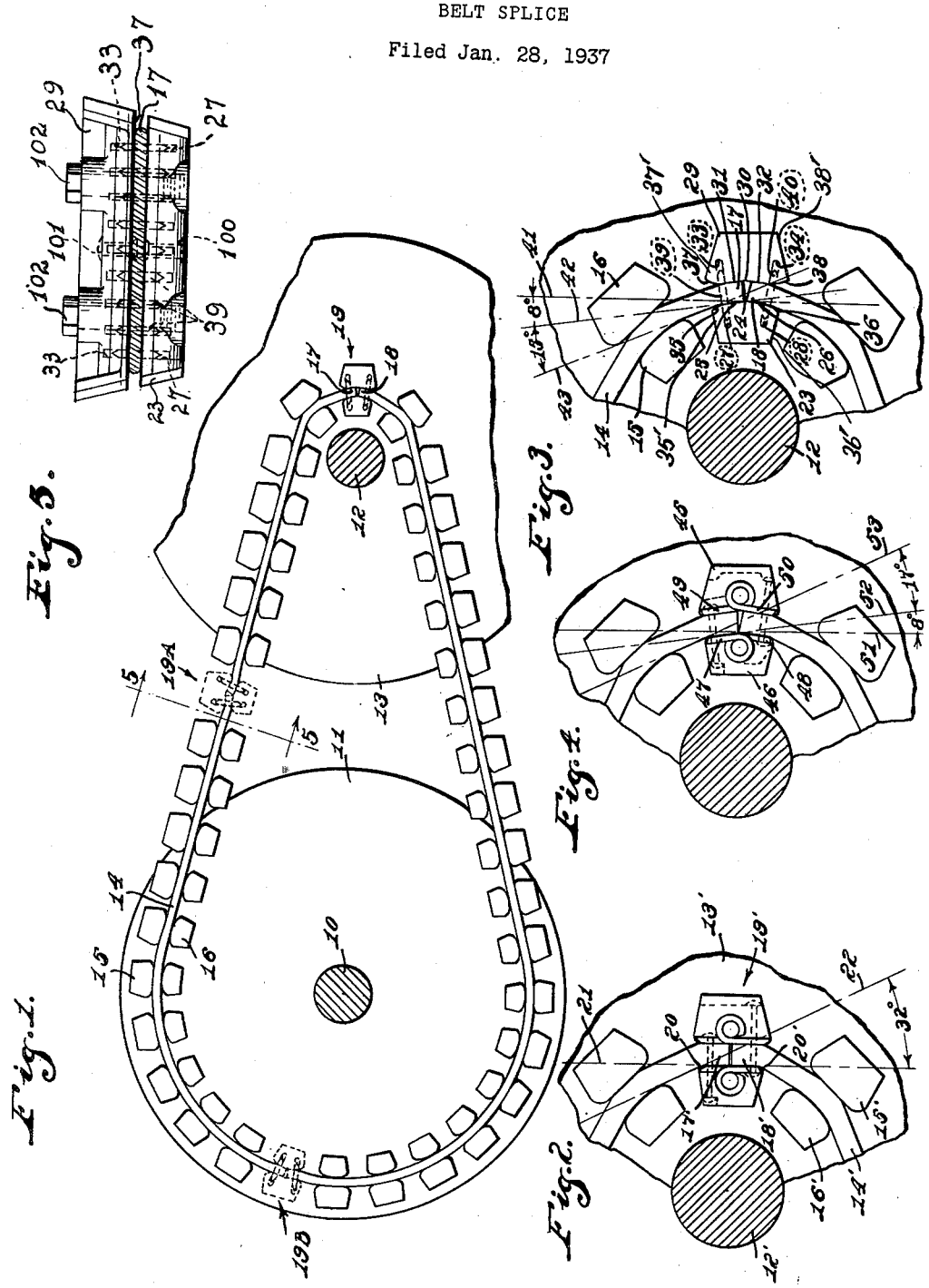

2,179,813

UNITED STATES PATENT OFFICE 2,179,813

BELT SPLICE

Harry C. Clay, Columbus, Ind., assignor to Reeves Pulley Company, Columbus, Ind., a corporation of Indiana Application January 28, 1937, Serial No. 122,709

4 Claims. (Cl. 24—38)

The present application relates to a belt splice, and more particularly to a splice specifically adapted for use in connection with belts of the type which are used in the well known "Reeves" type of variable speed transmission. As is well known in the art, this type of transmission ordinarily incorporates a belt comprising a web which has little or no lateral rigidity, and to the inner and outer surfaces of which are attached series of laterally rigid blocks, in order to provide the necessary characteristics of a belt to effect a drive between cone pulleys. These belts are ordinarily not integral, but must be closed by connecting the two ends thereof; and a great deal of work has been done in the art looking toward the provision of a completely satisfactory splice for the belt ends.

In the past, much difficulty has been experienced as a result of maximum flexing of the belts at the corners of the splice blocks which have been used, at times when the belt is forced to run about a short radius curve at one of the pulleys; and it is the primary object of the present invention to overcome those difficulties by the provision of a novel splice block.

Further objects of the invention will appear as the description proceeds.

To the accomplishment of the above and related objects, my invention may be embodied in the forms illustrated in the accompanying drawing, attention being called to the fact, however, that the drawing is illustrative only, and that change may be made in the specific constructions illustrated and described, so long as the scope of the appended claims is not violated.

Fig. 1 is a side elevation of a belt of the character described, associated with a pair of expansible cone pulleys, only one cone of each pulley being illustrated;

Fig. 2 is an enlarged fragmental view showing a splice of the prior art in use at a point of short radius curvature;

Fig. 3 is a view similar to Fig. 2 but showing one embodiment of the splice block of the present application;

Fig. 4 is a view similar to Fig. 2 but showing another embodiment of a splice block of the present application; and Fig. 5 is a transverse sectional view taken substantially on the line 5—5 of Fig. 1 and looking in the direction of the arrows.

Referring more particularly to the drawing, it will be seen that I have indicated a pair of parallel shafts 10 and 12 upon which are respectively mounted coned discs 11 and 13; and it is to be understood that each of these discs is mated with a second disc, likewise mounted upon the illustrated shafts. In organizations of this type, the coned discs of each pair are relatively axially shiftable to vary the effective diameters of the pulleys formed thereby.

A driving connection between the two pulleys is provided by a belt comprising a web 14 to the outer surface of which is secured a series of blocks 15, and to the inner surface of which is secured a corresponding series of blocks 16. The two ends of the web are indicated at 17 and 18; and the reference numeral 19 indicates generally one embodiment of the splice of the present application, whereby the two ends 17 and 18 are joined.

In Fig. 2, I have illustrated a fragment of a similar organization in which a disc 13' is mounted upon a shaft 12', and is adapted to be driven by a belt comprising a web 14' having stiffening blocks 15' and 16' secured thereto. The ends 17' and 18' of the web are connected by a splice mechanism, indicated generally by the reference numeral 19', and corresponding to the splice disclosed in U. S. Patent No. 1,671,048 issued May 22, 1928, upon the application of Paul B. Reeves.

A considerable amount of research has developed the fact that web failures occur with rather startling frequency substantially at the points 20 and 20' of Fig. 2, when the splice illustrated in Fig. 2 is used; and that those failures are due to the extreme degree of flexing which occurs at those points 20 and 20' as the belt runs around a short radius curve on one of the pulleys, when the transmission is adjusted to an extreme ratio. As is clearly indicated in Fig. 2 by the reference lines 21 and 22, that degree of flexing is approximately 32 degrees. Experimentation has shown that, if that degree of flexing can be reduced, belt life is materially increased.

In Fig. 3, I have shown, upon an enlarged scale, the splice mechanism illustrated at 19 in Fig. 1. That mechanism comprises a block 23 adapted to be secured to the inner surfaces of the belt ends 17 and 18; and a block 29 secured to the outer surfaces of the belt ends, and clampingly connected to the block 23.

The block 23 is formed, on its outer surface which engages the belt ends, with a substantially median longitudinal ridge 24 bounded by angularly related plane surfaces 25 and 26 which are merged, respectively, by curved surfaces 35 and 36, with the lateral faces 35' and 36' of the block 23. In each of the plane surfaces 25 and 26, substantially at its outer edge, there are formed a plurality of sockets, the series of sockets 27 being formed in the surface 25, and the series of sockets 28 being formed in the surface 26.

Correspondingly, the block 29 is formed with a substantially median longitudinal groove 30 which is bounded by angularly related plane surfaces 31 and 32 which are merged, through curved surfaces 37 and 38, with the lateral faces 37′ and 38′ of the block 29. A series of sockets 33 is formed substantially at the outer edge of the surface 31; and a series of sockets 34 is formed substantially at the outer edge of the surface 32. As will be apparent from an inspection of the drawing, the sockets 27 and 28 are respectively substantially perpendicular to the surfaces 25 and 26; the sockets 33 and 34 are respectively substantially perpendicular to the surfaces 31 and 32; and the sockets 27 and 33 are coaxial and registering while the sockets 28 and 34 are likewise coaxial and registering.

A series of pins 39 is passed through the end 17 of the belt 14, the ends of each pin protruding from both sides of the belt, and the ends of said pins 39 are received respectively in the sockets 27 and 33. Similarly, a series of pins 40 is passed through the end 18 of the belt, the ends of each pin protruding from both sides of the belt and said pin ends are received respectively in the sockets 28 and 34.

Preferably, the belt end 17 is preliminarily connected to the block 23 by means of one or more rivets 100, and the belt end 18 is preliminarily connected to the block 29 by rivets 101; so that the belt ends may be controlled by manipulation of the blocks. The blocks are now brought into registry, the pins 39 and the pins 40 are entered in the sockets of the respective blocks and the two blocks are then connected and clamped together by means of bolts 102 passing through both of said blocks. Thus, the belt ends 17 and 18 are anchored on the blocks by means of the pins 39 and 40 and are clamped between the blocks through the medium of said bolts, the end portions of the belt being held respectively between the parallel surfaces 25 and 31 and the parallel surfaces 26 and 32.

As is clearly indicated by the reference lines 41 and 42 of Fig. 3, the belt end portions are held, by said parallel surfaces, in positions approximately 8 degrees displaced from tangency with the periphery of the curve which is being followed by the belt. As is clearly indicated by the reference lines 42 and 43 of Fig. 3, this minimum-radius curve results in a further angulation of the next adjacent portions of the belt to the extent of only 15 degrees. In other words, instead of having the 32 degree angular displacement of the portions of the belt immediately adjacent the clamped end portions, as in the organization of Patent No. 1,671,048, we have, in the organization of the present application, only an angular displacement of 15 degrees, for a corresponding curvature being followed by the belt.

As is indicated in Fig. 1, when the splice occupies the position indicated by the reference numeral 19A, the belt end portions are bent outwardly from the plane occupied by the adjacent portions of the belt and are held in that position between the parallel surfaces 25 and 31 and the parallel surfaces 26 and 32. As is indicated in Fig. 1 by the reference numeral 19B, there is a slight flexing of the end portions of the belt outwardly, even when the belt is following around a long radius curve.

In Fig. 4, I have shown a modified embodiment of the invention of the present application, in which splice elements 45 and 46, similar to the elements of the splice mechanism 19′, are used. In the organization of Fig. 4, the connector plates 47 and 48 are angularly disposed, instead of being arranged in a single plane as in Fig. 2; and the connector plates 49 and 50 are similarly angularly disposed. As is indicated by the reference lines 51, 52 and 53, the degree of angular displacement of adjacent portions of the belt is considerably reduced by this arrangement; but I find that the structure illustrated in Fig. 4 is relatively difficult to produce and to maintain, as compared with the structure of Fig. 3; for which reason I prefer the embodiment illustrated in Fig. 3.

I claim is my invention:

1. For use with a belt, splicing means comprising a block adapted to be associated with the inner surfaces of the ends of the belt, said block being formed, upon its face engageable with the belt, with two plane surfaces respectively sloping inwardly from a median line of juncture, and with curved surfaces merging the remote edges of said sloping surfaces with the lateral faces of said block, a cooperating block adapted to be associated with the outer surfaces of the ends of the belt, said last-mentioned block being formed, upon its face engageable with the belt, with two plane surfaces respectively sloping inwardly from a median line of juncture, and with curved surfaces merging the remote edges of said sloping surfaces with the lateral faces of said last-mentioned block, and means for clamping said first- and second-mentioned blocks against opposite faces of the belt with the sloping surfaces of said second block substantially parallel with the sloping surfaces of said first block, the ends of said belt being received and clamped between said sloping surfaces of the respective blocks.

2. For use with a belt, splicing means comprising a block adapted to be associated with the inner surfaces of the ends of the belt, said block being formed, upon its face engageable with the belt, with two plane surfaces respectively sloping inwardly from a median line of juncture, and with curved surfaces merging the remote edges of said sloping surfaces with the lateral faces of said block, a cooperating block adapted to be associated with the outer surfaces of the ends of the belt, said last-mentioned block being formed, upon its face engageable with the belt, with two plane surfaces respectively sloping inwardly from a median line of juncture, and with curved surfaces merging the remote edges of said sloping surfaces with the lateral faces of said last-mentioned block, means for clamping said first- and second-mentioned blocks against opposite faces of the belt with the sloping surfaces of said second block substantially parallel with the sloping surfaces of said first block, the ends of said belt being received and clamped between said sloping surfaces of the respective blocks, and means independent of said clamping means for holding said belt ends against movement with respect to said block surfaces.

3. For use with a belt, splicing means comprising a block adapted to be associated with the inner surfaces of the ends of the belt, said block being formed upon its face engageable with the belt, with two plane surfaces respectively sloping inwardly from a median line of juncture, and with curved surfaces merging the remote edges of said sloping surfaces with the lateral faces of said block, a cooperating block adapted to be associated with the outer surfaces of the ends of the belt, said last-mentioned block being formed, upon its face engageable with the belt, with two plane surfaces respectively sloping inwardly from a median line of juncture, and with curved surfaces merging the remote edges of said sloping surfaces with the lateral faces of said last-mentioned block, means for clamping said first- and second-mentioned blocks against opposite faces of the belt with the sloping surfaces of said second block substantially parallel with the sloping surfaces of said first block, the ends of said belt being received and clamped between said sloping surfaces of the respective blocks, the sloping surfaces of both blocks being penetrated by series of sockets, and a series of pins passing through each end of the belt and protruding from both sides thereof, the protruding ends of each series of pins being received in the sockets formed in the parallel surfaces of said blocks.

4. For use with a belt, splicing means comprising a block adapted to be associated with the inner surfaces of the ends of the belt, said block being formed, upon its face engageable with the belt, with two plane surfaces respectively sloping inwardly from a median line of juncture, and with curved surfaces merging the remote edges of said sloping surfaces with the lateral faces of said block, a cooperating block adapted to be associated with the outer surfaces of the ends of the belt, said last-mentioned block being formed, upon its face engageable with the belt, with two plane surfaces respectively sloping inwardly from a median line of juncture, and with curved surfaces merging the remote edges of said sloping surfaces with the lateral faces of said last-mentioned block, means for clamping said first- and second-mentioned blocks against opposite faces of the belt with the sloping surfaces of said second block substantially parallel with the sloping surfaces of said first block, the ends of said belt being received and clamped between said sloping surfaces of the respective blocks, the sloping surfaces of both blocks being penetrated by series of sockets normal to said surfaces, and a series of pins passing through each end of the belt and protruding from both sides thereof, the protruding ends of each series of pins being received in the sockets formed in the parallel surfaces of said blocks.

HARRY C. CLAY.